W. A. Clark.
Expansion Bit.
No. 3,733. Reissued Nov. 16, 1869.
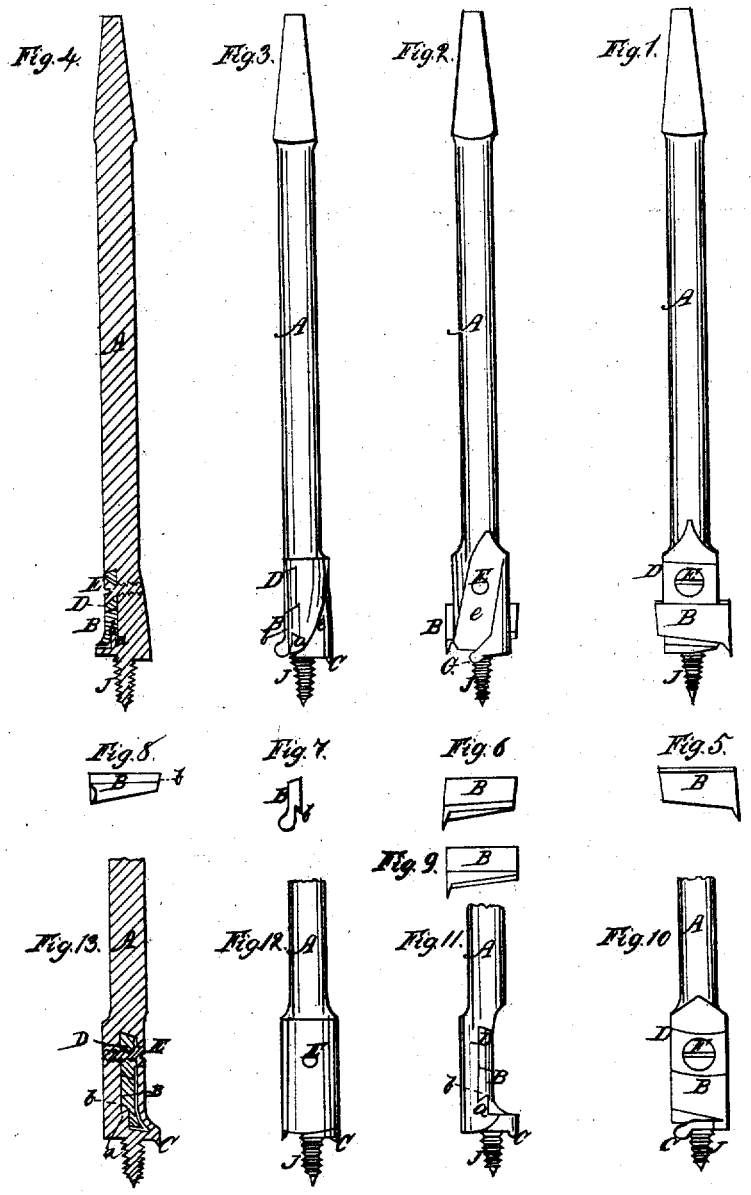
N. PETERS, PHOTO-LITHOGRAPHER, WASHINGTON, D. C.

United States Patent Office.

WILLIAM A. CLARK, OF WOODBRIDGE, CONNECTICUT.

*Letters Patent No.* 20,192, *dated May* 11, 1858; *reissue No.* 3,516, *dated June* 22, 1869; *reissue No.* 3,733, *dated November* 16, 1869.

IMPROVEMENT IN EXPANSIVE BITS.

The Schedule referred to in these Letters Patent and making part of the same.

*To whom it may concern:*

Be it known that I, WILLIAM A. CLARK, of Woodbridge, in the county of New Haven, and State of Connecticut, have invented a new Improvement in Expansive Bits; and I do hereby declare the following to be a full, clear, and exact description of the same, reference being had to the accompanying drawings, in which—

Figure 1 is a side view of an expansive bit, embodying a portion of my improvements;

Figure 2, an opposite side view;

Figure 3, an elevation, its plane of projection being transverse to figs. 1 and 2;

Figure 4, a sectional elevation, its plane of projection being parallel to that in fig. 3, but transverse to that in figs. 1 and 2;

Figure 5, a side elevation of the movable cutter;

Figure 6, a reverse view of it;

Figure 7, an end elevation;

Figure 8, an inverted plan, or, in other words, an under-side view;

Figure 9, a backside elevation of a cutter so made as to always keep the movable cutter at just the same distance behind the point of the bit, while at the same time the depth of wood left to support the central portion of the bit is varied by the adjustment of said cutter;

Figure 10, a side elevation of a bit, which, while embodying the same novel features as represented in the previous figures, is also so formed as to throw the chips in front of the movable cutter, which arrangement avoids the necessity of filing away the backside of the bit to allow the chips to pass;

Figure 11, an elevation transverse to fig. 10;

Figure 12, a backside elevation of the same bit; and in

Figure 13, a vertical section, showing the same movable cutter secured in the same way in a mortise, instead of a recess in the body of the bit.

This invention relates to an improvement in what are known as expansive bits, that is, bits constructed with an adjustment whereby the cutter may be extended or contracted so as to cut a larger or smaller hole, as the case may be; and The invention may be stated in general to consist of an expansive bit composed of a recessed shank, into which the adjustable or expanding cutter is fitted, and in which it is adjusted and held, substantially as hereinafter described.

To enable others to fully understand my invention, I will proceed to describe the same as illustrated in the accompanying drawings.

A is the shank of the bit, upon which the inner or stationary cutter is formed, and in which the recess or mortise is made, which receives the movable cutter B. The construction of the main portion of the shank, and of the cutting-lip permanently attached to it, is very much the same as those of other expansive bits, but the mode of securing the movable cutter B in its place is different.

In order to provide for the securing of the movable cutter B, I form an open recess in my bit, from the bottom of which rises a V-shaped ledge, *a*, so as to receive the V-shaped groove *b* in the said movable cutter. The form of the ledge *a* and that of the groove *b* is shown in figs. 3, 4, 11, and 13. The form of the groove is also shown in fig. 7. The form of the groove *b*, and of the ledge upon which it rests, is such as to give a firm bearing to the cutter B, and draw it snugly against the back of the recess when the pressure is applied, which secures the said cutter in place.

The cutter, when thus dovetailed into the shank at its lower end, is secured in place with great ease, and without danger of injuring its cutting-edge, which is entirely relieved from any injurious pressure and contact with the shank, by reason of the dovetail connection between the shank and the lower end of the cutter, this connection also serving to bind that end of the cutter most firmly and tightly to the shank.

In order to secure the cutter, I employ a bevelled plate or follower, D, driven home by a screw, E, in such manner as to press the cutter B against the backside and bottom of the recess in which it is secured, the said cutter being also bevelled, as shown, to facilitate the accomplishment of this purpose.

The form and arrangement of these parts are shown in figs. 1, 3, 4, 10, 11, and 13. In the first four figures, the relative positions of the cutters are such as to deliver the chips from the stationary cutter C upon the backside of that part of the stock which supports the movable cutter, and this involves the necessity of cutting away the stock, as shown at *e* in figs. 2 and 3, to allow the chips to pass. This, of course, weakens that part of the stock, and makes it necessary to secure sufficient strength by retaining more metal on the side upon which the cutter B is attached, and, as a consequence, the edge of this cutter is thrown out too far from the centre of the stock, and its efficiency of operation in different positions is thereby reduced.

To obviate this difficulty, I form the stationary lip C in that position upon the stock in which it is represented in figs. 10, 11, 12, and 13, by which arrangement the chips from it are delivered upon that side of the stock which is cut away to receive the cutter B, which allows the opposite side to be left entire, and also so balances the operating-parts as to relieve the screw J from a portion of the pressure which would otherwise be thrown upon it when in operation.

This arrangement enables me to bring the edge of the cutter B nearly back to the centre of the stock, as shown in fig. 11, and, in large bits, it may be brought further back than it is there represented as being placed.

It may in some cases be considered desirable, in the construction of very large bits, to leave a portion of metal in front of the cutter B, as shown in fig. 13, for the more effectual support of that side of the bit. In this case the screw E should extend through this part, as shown.

The mode which I have above described of supporting and securing the cutter B, supports it without its resting on the cutting-edge, and in my construction, space is left under the cutting-edge, as shown; and by thus supporting it, the edge of a large cutter may be set higher in the stock than it is necessary or best to set the edge of a small one, which allows more wood to be left near the stock, to support it where a large cutter is used. The cutting-edge of the cutter B is inclined so as to bring its working-end lower than the other, for the twofold purpose of causing the unemployed end to clear the wood, and of leaving a portion of the wood around the central portion of the bit to support it, while at the same time the outer end of the cutter B shall cut nearly or quite as far in advance as the inner cutter. The seat upon which the movable cutter rests at the bottom, has, in most expansive bits, an inclination corresponding with that of the edge of the said cutter, and this feature is retained in my bit, as represented in all the drawings except fig. 9. When so constructed, the sliding of the movable cutter outward, also carries its working-end downward, so that when placed in its extreme outward position, it will cut considerably deeper than when withdrawn so as to cut its minimum hole. It is desirable, however, that the depth it will cut shall be as nearly equal as possible; and further, it becomes necessary, when the movable cutter is required to cut away a very large amount of wood, to preserve a considerable shoulder of the wood adjacent to the stock, for its support against the strain imposed upon it by the resistance against the movable cutter. For this purpose I make my longer cutters so that the edge shall stand a little higher in the stock than the edges of those which are intended to cut a smaller hole, which my mode of supporting the cutters upon a ledge or shoulder, placed above the edge, enables me to do; and this provision for giving the proper shoulder and depth of cut, answers very satisfactorily for most purposes.

Should greater nicety in these respects be desirable, it may be attained by the adoption of the cutter shown in fig. 9, and the use of a horizontal V in the stock, as in this case the edge of the cutter is inclined with reference to the groove *b*, while in the cutters shown in the previous figures it is parallel to it. This arrangement causes the point of the movable cutter to always work at the same depth, and makes the depth of the shoulder in exact proportion to the distance at which the point of the cutter is set from the centre.

Bits with movable cutters secured in a mortise in the shank or stock, have been long known, but the modes which have been adopted for securing these cutters have been more or less objectionable, so much so as to interfere with their general use. One objection is that the bit, or more properly the movable cutter, being secured by being keyed down upon the bottom of the mortise, the cutting-edge of this movable cutter rests upon the middle of the stock, which not only destroys the cutting-edge of wood-boring tools, but also precludes such an arrangement as would allow a greater depth of wood to be left contiguous to the central cutter or stock, to support it when a larger cutter is put in, or a larger hole bored, which requires such support for the stock. These objections are entirely overcome by my invention.

Having fully described my invention,

What I claim as new and useful, and desire to secure by Letters Patent, is—

1. The formation of a V-ledge in the recessed shank, and a correspondingly-shaped recess in the adjustable cutter, back of or above its cutting-edge, to fit the ledge in the shank, substantially as and for the purposes set forth.

2. The combination, with the recessed shank and adjustable cutter in which a V-ledge and correspondingly-shaped recess are respectively formed, as specified, of the follower and screw for driving home the cutter against the said V-ledge, which forms its lower bearing, and binds it to the shank, substantially as shown and set forth.

In testimony whereof, I have here signed my name, in presence of two subscribing witnesses.

Witnesses: WM. A. CLARK.

M. BAILEY,

W. H. MCCABE.